(12) United States Patent
Ohji et al.

(10) Patent No.: US 7,651,128 B2
(45) Date of Patent: Jan. 26, 2010

(54) INFLATOR

(75) Inventors: Nobuyuki Ohji, Tatsuno (JP); Masayuki Nakayasu, Tatsuno (JP)

(73) Assignee: Daicel Chemical Industries, Ltd., Osaka (JP)

( * ) Notice: Subject to any disclaimer, the term of this patent is extended or adjusted under 35 U.S.C. 154(b) by 186 days.

(21) Appl. No.: 11/740,826

(22) Filed: Apr. 26, 2007

(65) Prior Publication Data

US 2007/0257477 A1 Nov. 8, 2007

Related U.S. Application Data

(60) Provisional application No. 60/796,520, filed on May 2, 2006.

(30) Foreign Application Priority Data

Apr. 28, 2006 (JP) ............................. 2006-124645

(51) Int. Cl.
*B60R 21/26* (2006.01)
(52) U.S. Cl. .................................................... 280/741
(58) Field of Classification Search ................. 280/741, 280/740, 742, 736
See application file for complete search history.

(56) References Cited

U.S. PATENT DOCUMENTS

| 6,722,694 | B1 | 4/2004 | Nakashima et al. |
| 2003/0010247 | A1 | 1/2003 | Miyaji et al. |
| 2004/0123925 | A1 | 7/2004 | Wu |
| 2005/0206145 | A1 | 9/2005 | Kato et al. |

FOREIGN PATENT DOCUMENTS

| EP | 1155927 A1 | 11/2001 |
| EP | 1568925 A1 | 8/2005 |
| JP | 2000-296756 A | 10/2000 |
| JP | 2001-233166 A | 8/2001 |
| JP | 3315686 B2 | 6/2002 |
| JP | 2004-155645 A | 6/2004 |

*Primary Examiner*—Faye M. Fleming
(74) *Attorney, Agent, or Firm*—Birch, Stewart, Kolasch & Birch, LLP

(57) ABSTRACT

An inflator includes,
a housing having a gas discharge port,
an ignition device and a gas generating agent accommodated inside the housing, and
a collision member for receiving collision of a combustion product(s) which is generated by the activation of the ignition device, the collision member being provided in a position directly facing an ejecting direction of the combustion products.

7 Claims, 6 Drawing Sheets

(a)  (b)

INFLATOR

This nonprovisinal application claims priority under 35 U.S.C. § 119(a) on Patent Application No. 2006-124645 filed in Japan on 28 Apr. 2006 and 35 U.S.C. § 119(e) on U.S. Provisional Application No. 60/796,520 filed on 2 May 2006, which are incorporated by reference.

BACKGROUND OF INVENTION

1. Field of Invention

The present invention relates to an inflator that can be used for a human body restraining device for an automobile.

2. Description of Related Art

Theoretically, increasing the inner pressure of an inflator during combustion can be considered as means for purifying the gas released from the inflator, but in this case a thick-wall inflator is necessary to withstand the inner pressure. This, however, becomes a crucial drawback for the inflators that have to be reduced in weight and size to make them easy to manufacture and commercially successive.

JP-A No. 3315686 and JP-A No. 2000-296756 disclose a gas generator of a pyrotechnic dual-type in which the flame of an enhancer is uniformly ejected inside a first combustion chamber in order to improve the flame propagation ability in the first combustion chamber.

However, although such a method ensures good flame propagation ability, because a large number of molded articles of the gas generating composition are exposed to an intense flame from the enhancer, the molded articles of the gas generating composition are crushed and pulverized by impacts during collision with the flame. The resultant problem is that the combustion is greatly intensified and an amount of nitrogen oxide or carbon monoxide present in the combustion products increases.

In addition, JP-A No. 2001-233166 may be cited as the background art of the present invention.

SUMMARY OF INVENTION

The present invention relates to an inflator including:
a housing having a gas discharge port,
an ignition device and a gas generating agent accommodated inside the housing, and
an collision member for receiving collision of a combustion product(s) which is generated by activation of the ignition device, the collision member being provided in a position directly facing an ejecting direction of the combustion products.

The present invention further relates to an inflator including:
a housing having a gas discharge port,
a combustion chamber cup member, which accommodates at least an ignition device, being disposed inside the housing,
the combustion chamber cup member having a gas ejection opening for ejecting a combustion product(s) generated by activation of the ignition device,
a collision member, for receiving collision of the combustion products, being provided in a position directly facing the gas ejection opening.

The present invention further relates to an inflator including:
a housing having a gas discharge port,
a first combustion chamber and a second combustion chamber being defined inside the housing,
a first ignition device and a first gas generating agent accommodated inside the first combustion chamber, a combustion product(s) generated by activation of the first ignition device being ejected only in one direction,
a second combustion cup member disposed inside the housing and separating the second combustion chamber from the first combustion chamber, the second combustion chamber cup member accommodating a second gas generating agent and a second ignition device,
the second combustion chamber cup member being disposed in a position directly facing the ejecting direction of the combustion products, and a circumferential surface of the second combustion chamber cup member serving as a collision member for receiving collision of the combustion products.

BRIEF DESCRIPTION OF DRAWINGS

The present invention will become more fully understood from the detailed description given hereinblow and the accompanying drawings which are given by way of illustration only, and thus are not limitative of the present invention and wherein.

DETAILED DESCRIPTION OF INVENTION

Figure 1:
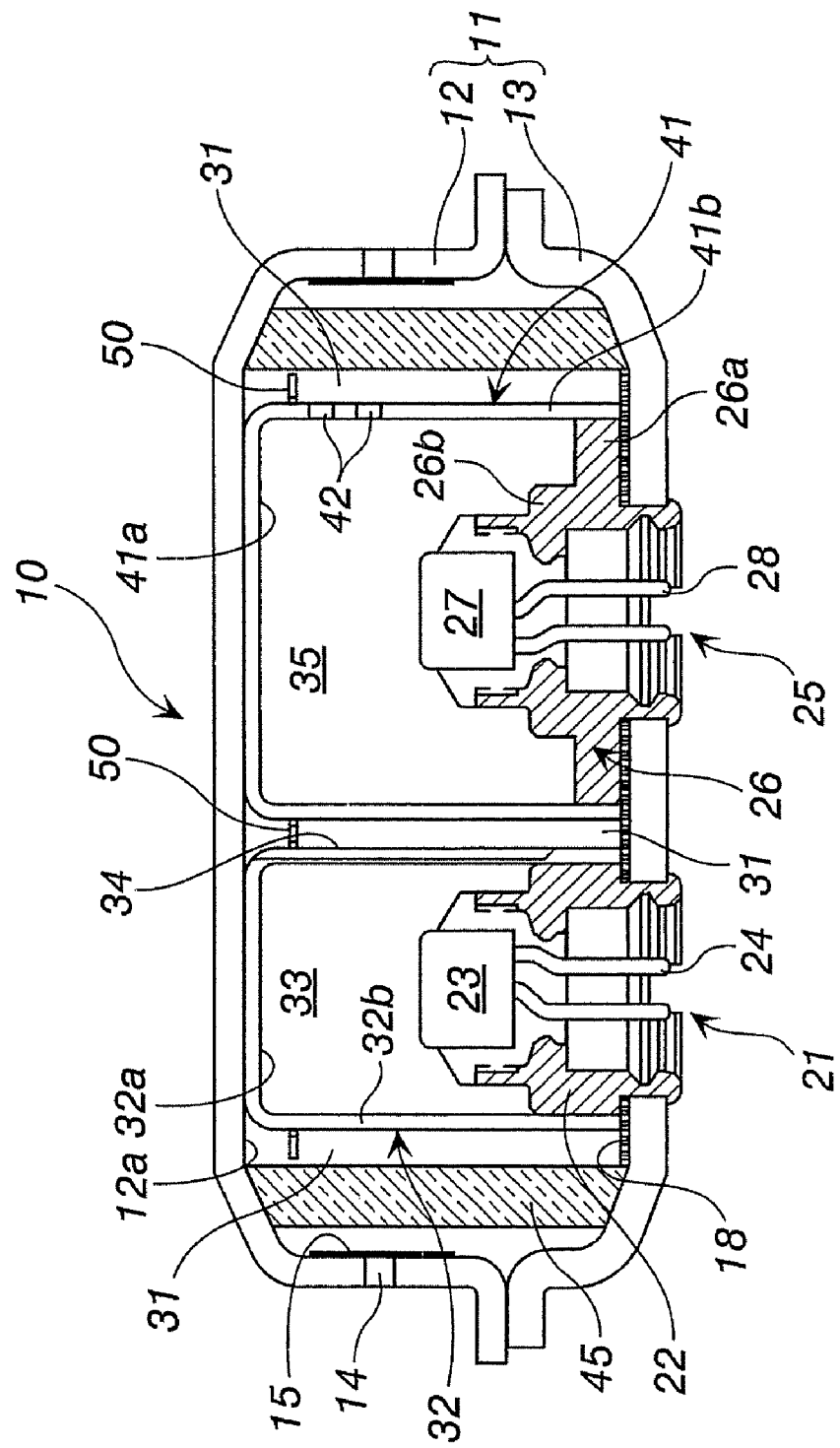
FIG. 1 shows an axial sectional view of the inflator.

The present invention relates to an inflator in which the generated combustion products can be further purified by improving the combustion state of a gas generating agent.

Any collision member may be employed as long as it acts to change the direction of combustion products (preferably, diffuse the combustion products) when the combustion products generated by actuation of an ignition device collide with the collision member. For example, a plate-like member or a cylindrical member disposed inside the housing can be used as the collision member.

Because the collision member is provided in the position directly opposite to the discharge direction of the combustion products, one, two, or more collision members can be arranged according to the discharge direction of the combustion products from the ignition device.

Well-known electric igniters (igniters using zirconium or potassium perchlorate as an ignition agent) that have been generally used in gas generators for airbags or the like can be used as the ignition device, and if necessary, a well-known enhancer agent may be used therewith. And a well-known gas generating agent can be used. For example, a gas generating agent disclosed in JP-A No. 2004-155645 can be used.

If such a collision member is present, the combustion products (flame, high-temperature gas, collision wave, and the like) generated by the actuation of the ignition device collide with the collision member and the direction of the combustion products are changed or they are diffused. As a result, an impact that is directly applied to the gas generating agent is weakened and the gas generating agent is prevented from being crushed. Therefore, the gas generating agent is prevented from reaching an extreme combustion state and the generated combustion products can be purified.

The gas generating agent may be also charged between the ignition device and the collision member, but it is preferred that the gap between the ignition device and the collision member be reduced and that an amount of the gas generating agent present between the ignition device and the collision member be decreased.

The inflator in accordance with the present invention can be applied both to a single-type pyrotechnic inflator having a single combustion chamber and a single ignition device, and a dual-type pyrotechnic inflator having two combustion chambers and two ignition devices, and the inflator in accordance with the present invention can be also applied to hybrid inflators using a gas generating agent together with a pressurized gas (such as argon, helium).

When the gas ejection opening is thus provided, the ejection direction of the combustion products can be controlled. Therefore, one, two, or more collision members are arranged in the position directly opposite to the gas ejection opening. No restriction is placed on the shape of the gas ejection opening, provided that it can directly face the collision member. Thus, a gas ejection opening in the form of a circle or slit can be used. Further, if necessary, the gas ejection opening can be closed from the inside with a stainless steel or aluminum seal tape.

The present invention preferably relates to the inflator, wherein the combustion products generated by the actuation of the ignition device are discharged only in one direction, or the gas ejection opening is opened only in one direction.

Because the combustion products flow out only in one direction, the following effects can be obtained: intense combustion caused by crushing and pulverization of the molded articles of the gas generating composition, such as disclosed in JP-B No. 3315686 and JP-A No. 2000-296756 can be prevented, at least the released gas can be purified, and the occurrence of mist can be reduced. Furthermore, only a single collision member is sufficient and the internal structure can be simplified.

The present invention preferably relates to the inflator, wherein the collision member has a curved surface and the curved surface is directly opposite to the discharge direction of the combustion products or the gas ejection opening.

No specific limitation is placed on the shape of the collision member, and it may be either flat or curved, but a collision member having a curved surface (the surface that is directly opposite the combustion products is a convex and/or concave curved surface) is preferably used because the diffusion ability of combustion products during collision is improved.

Because the circumferential surface of the second combustion chamber cup member serves as a collision member for causing the collision of the combustion products, no separate collision member has to be provided.

The present invention preferably relates to the inflator, wherein at least an ignition portion of the ignition device is surrounded by an ignition device cup member in the first combustion chamber, and the ignition device cup member has a gas ejection opening that is open only in one direction to discharge the combustion products.

Because the circumferential surface of the second combustion chamber cup member serves as a collision member for causing the collision of the combustion products, no separate collision member has to be provided. No restriction is placed on the shape of the gas ejection opening, provided that it can be directly opposite the collision member. Thus, a gas ejection opening in the form of a circle or slit can be used. Further, if necessary, the gas ejection opening can be closed from the inside with a stainless steel or aluminum seal tape.

In the inflator in accordance with the present invention, the combustion state of gas generating agent is improved. As a result, the concentration of nitrogen oxides or carbon monoxide in the generated gas can be reduced, the generated gas can be purified, and an amount of mist or microparticles in the combustion products can be reduced.

EMBODIMENTS OF INVENTION (1) Inflator Shown in FIG. 1

Figure 2:
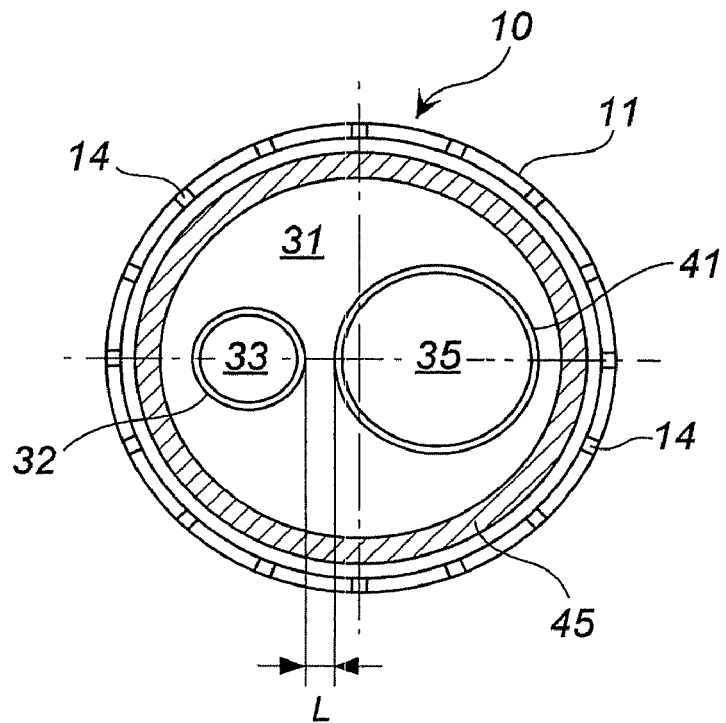
FIG. 2 shows a plan view (in a state in which the ceiling portion of the housing is removed) of the inflator shown in FIG. 1.
Figure 4:
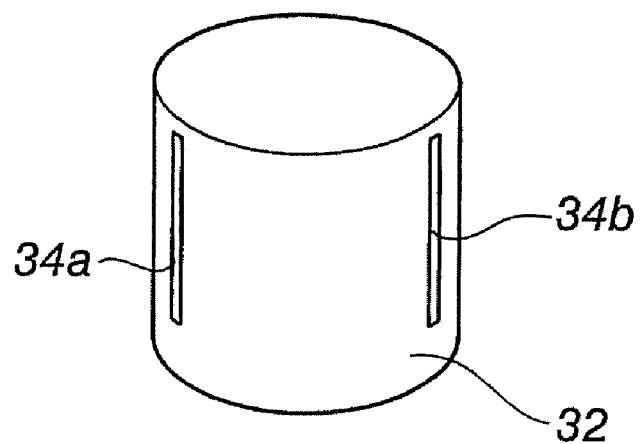
FIG. 4 shows a perspective view illustrating a first gas ejection opening of another embodiment in the combustion chamber cup member of a Comparative Example.
Figure 5:
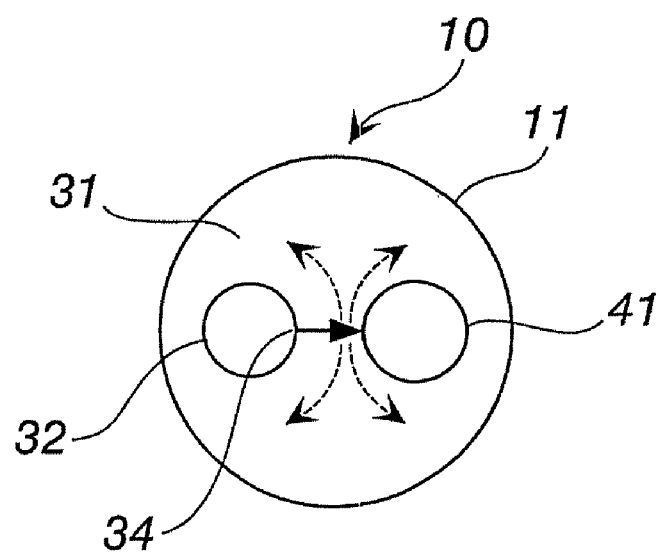
FIG. 5 shows an explanatory drawing illustrating the operation of the inflator shown in FIG. 1.
Figure 6:
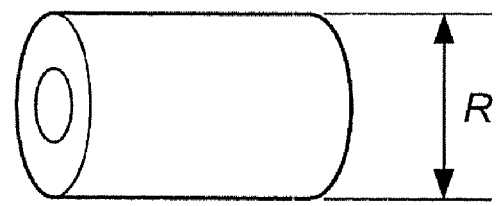
FIG. 6 shows a front view of a molded article of a gas generating composition used in the inflator shown in FIG. 1.

FIG. 1 is a longitudinal sectional view of an inflator having two combustion chambers. FIG. 2 is a plan view (state in which the ceiling portion of the housing is removed) of the inflator shown in FIG. 1. FIGS. 3(a), (b) are perspective view of a cup member forming a first combustion chamber. FIG. 4 is a perspective view of the cup member of a comparative example. FIG. 5 is an explanatory drawing illustrating the operation of the inflator. FIG. 6 is a front view of a molded article of a gas generating composition that can be used in the inflator shown in FIG. 1. In FIG. 5, the arrangement state of an enhancer chamber cup member 32 and a combustion chamber cup member 41 is made different from the arrangement state shown in FIG. 2, in order to facilitate the explanation of operation.

An outer shell of a gas generator 10 for an airbag is formed by a housing 11 obtained by joining together and integrating a diffuser shell 12 and a closure shell 13. The diffuser shell 12 and the closure shell 13 are welded to each other in joint portions thereof.

A plurality of gas discharge ports 14 are provided in the circumferential surface of the diffuser shell 12, and the gas discharge ports 14 are closed from the inside with an aluminum or stainless steel seal tape 15.

Two holes are provided in the bottom surface of the closure shell 13, and a first ignition device 21 and a second ignition device 25 are fitted into the holes so that the penetration of moisture from the external atmosphere can be prevented.

The first ignition device 21 has a first igniter 23 fixed to a first igniter collar 22. A connector having lead wire are fitted into portions including two electroconductive pins 24 that extend from the first igniter 23, and the connector is connected to a battery.

The second ignition device 25 has a second igniter 27 fixed to a second igniter collar 26. A Connector having a lead wire is inserted into portions of two electroconductive pins 28 that extend from the second igniter 27, and the connector is connected to a battery. The second igniter collar 26 has a larger-diameter portion 26a and a smaller-diameter portion 26b.

A first combustion chamber 31 and a second combustion chamber 35 are provided inside the housing 11. The second combustion chamber 35 is separated from the first combustion chamber 31 by a combustion chamber cup member 41. The combustion chamber cup member 41 serves as a collision member.

FIG. 1 shows a state in which the second combustion chamber 35 is enveloped by the first combustion chamber 31, but the first combustion chamber 31 and the second combustion chamber 35 may be disposed adjacent to each other. A first gas generating agent (not shown in the drawing) is charged into the first combustion chamber 31, and a second gas generating agent (not shown in the drawing) is charged into the second combustion chamber 35.

As shown in FIG. 1 and FIG. 2, because the enhancer chamber cup member 32 and the combustion chamber cup member 41 are disposed close to each other, an amount of the first gas generating agent charged in a gap between the two cup members is small or, preferably, no first gas generating agent is present in the gap. As shown in FIG. 2, when the gap between the enhancer chamber cup member 32 and the combustion chamber cup member 41 is denoted by L and the diameter of the first gas generating agent (in a single-perforated columnar body as shown in FIG. 6) is denoted by R, the gap L and diameter R preferably satisfy the relationship of $0.5R<L<3R$, more preferably $0.5R<L<2R$, even more preferably $0.5R<L<R$.

An enhancer chamber cup member 32 is disposed inside the first combustion chamber 31, and the inside of the enhancer chamber cup member 32 is an enhancer chamber 33 and has accommodated therein an enhancer agent (not shown in the drawing) and the second ignition device 21.

A single slit-like first gas ejection opening 34, such as shown in FIG. 3(a), is provided in the height direction (axial direction of the housing 11) at the circumferential surface 32b of the enhancer chamber cup member 32, and this slit-like first gas ejection opening 34 directly faces a circumferential surface of the combustion chamber cup member (collision member) 41. The slit-like first gas ejection opening 34 is closed from the inside with a stainless steel seal tape.

The first gas ejection opening 34 can be formed as two slit-like first gas ejection openings 34a, 34b that are provided with a small spacing in the circumferential direction, as shown in FIG. 3(b), provided that they can be provided to directly face the circumferential surface of the combustion chamber cup member (collision member) 41. By contrast, when the two slit-like first gas ejection openings 34a, 34b are formed with a large spacing in the circumferential direction, as shown in FIG. 4, the first gas ejection opening 34a, 34b cannot be provided to directly face the circumferential surface of the combustion chamber cup member (collision member) 41 and, therefore, such a configuration is not included in the present invention.

The slit-like first gas ejection opening 34 shown in FIG. 3(a), (b) are provided in the vicinity of the central portion in the height direction of the enhancer chamber cup member 32, but no restriction is placed on the height range or number thereof, provided that they can be provided to directly face the circumferential surface of the combustion chamber cup member (collision member) 41.

The opening portion of the enhancer chamber cup member 32 is fitted to the first igniter collar 22, the peripheral edge of the opening portion abuts against a gasket 18 disposed at the bottom surface of the housing 11, and. the bottom portion 32a abuts against a ceiling surface 12a of the housing 11. Therefore, the enhancer chamber cup member 32 is positioned by the first igniter collar 22 and fixed by the ceiling surface 12a and the gasket 18 so as to be pushed from above and below.

The combustion chamber cup member 41 forming the second combustion chamber 35 is press-fitted to the larger-diameter portion 26a of the second igniter collar 26 that has an outer diameter larger than the inner diameter of the combustion chamber cup member 41. By so press-fitting the combustion chamber cup member 41 to the larger-diameter portion 26a, the combustion chamber cup member 41 is positioned and movement thereof in the axial direction and radial direction is prevented.

The peripheral edge of the opening portion of the combustion chamber cup member 41 is abutted against a gasket 18 disposed at the bottom surface of the housing 11, and a bottom portion 41a of the combustion chamber cup member is abutted against the ceiling surface 12a of the housing 11. Accordingly, the combustion chamber cup member 41 is fixed by being pushed in the vertical direction by the ceiling surface 12a and gasket 18. It is also possible not to use the gasket 18.

A plurality of round second gas ejection openings 42, that are closed from the inside with a stainless steel tape, are formed in a circumferential surface 41b of the combustion chamber cup member 41. The second gas ejection openings are not formed in the circumferential surface that directly faces the slit-like first gas ejection opening 34 of the enhancer chamber cup member 32.

A disk-like retainer 50 for adjusting the volume of the first combustion chamber 31 according to a charged amount of the first gas generating agent is inserted into the first combustion chamber 31. The retainer 50 has two orifices and these two orifices are fitted to the combustion chamber cup member 41 and the enhancer chamber cup member 32.

A cylindrical coolant/filter 45 having a function of filtering and cooling the combustion gas is disposed outside the first combustion chamber 31, and a gap is provided between the outer circumferential surface of the coolant/filter 45 and the gas discharge port 14 as well as the seal tape 15.

The operation of the gas generator for an air bag shown in FIG. 1, FIG. 2, and FIG. 3(a) in the case where the gas generator is applied to an airbag system of an automobile will be explained below. The actuation of the first igniter 23 and the second igniter 27 takes place according to the degree of the impact received by the automobile during collision. Thus, there can be the case in which only the first igniter 23 is actuated, the case in which the first igniter 23 is actuated first and then the second igniter 27 is actuated with a delay, and the case in which the first igniter 23 and the second igniter 27 are actuated simultaneously. The case in which the first igniter 23 is actuated first and then the second igniter 27 is actuated with a delay will be described below.

When the automobile collides and receives an impact, an actuation signal is received from a control unit, the first igniter 23 is actuated and ignited to ignite and burn the enhancer agent. Then, the stainless steel tape that seals the slit-like first gas ejection opening 34 is ruptured by the increase in pressure inside the enhancer chamber 33, and the combustion products are discharged from the slit-like first gas ejection opening 34 (shown in the solid line arrow in FIG. 5).

The discharged combustion products collide with the circumferential surface of the combustion chamber cup member (collision member) 41 that is disposed to directly face the slit-like first gas ejection opening 34, and the combustion products are diffused, for example, as shown by a dotted line arrow in FIG. 5, and then cause ignition and combustion of the first gas generating agent loaded into the first combustion chamber 31, so that a high-temperature combustion gas is produced. The combustion gas is filtered and cooled by the coolant/filter 45, then ruptures the seal tape 15 and is released from the gas discharge port 14, thereby inflating the airbag.

At this time, because the gas ejection opening 42 of the second combustion chamber 35 is not provided in the circumferential surface of the combustion chamber cup member (collision member) 41 that is disposed to directly face the slit-like first gas ejection opening 34, the second gas generating agent is not ignited or combusted by the combustion products released from the slit-like first gas ejection opening 34.

The second igniter 27 is actuated and ignited with a slight delay to ignite and burn the second gas generating agent, and a high-temperature combustion gas is then generated. The stainless steel tape closing the second gas ejection opening 42 of the combustion chamber cup member 41 is ruptured due to pressure of the high temperature combustion gas, and the combustion gas flows out through the second gas ejection opening 42 and is filtered and cooled while passing through the coolant/filter 45. Then, the combustion gas is released from the gas discharge port 14, thereby further inflating the airbag.

Figure 7:
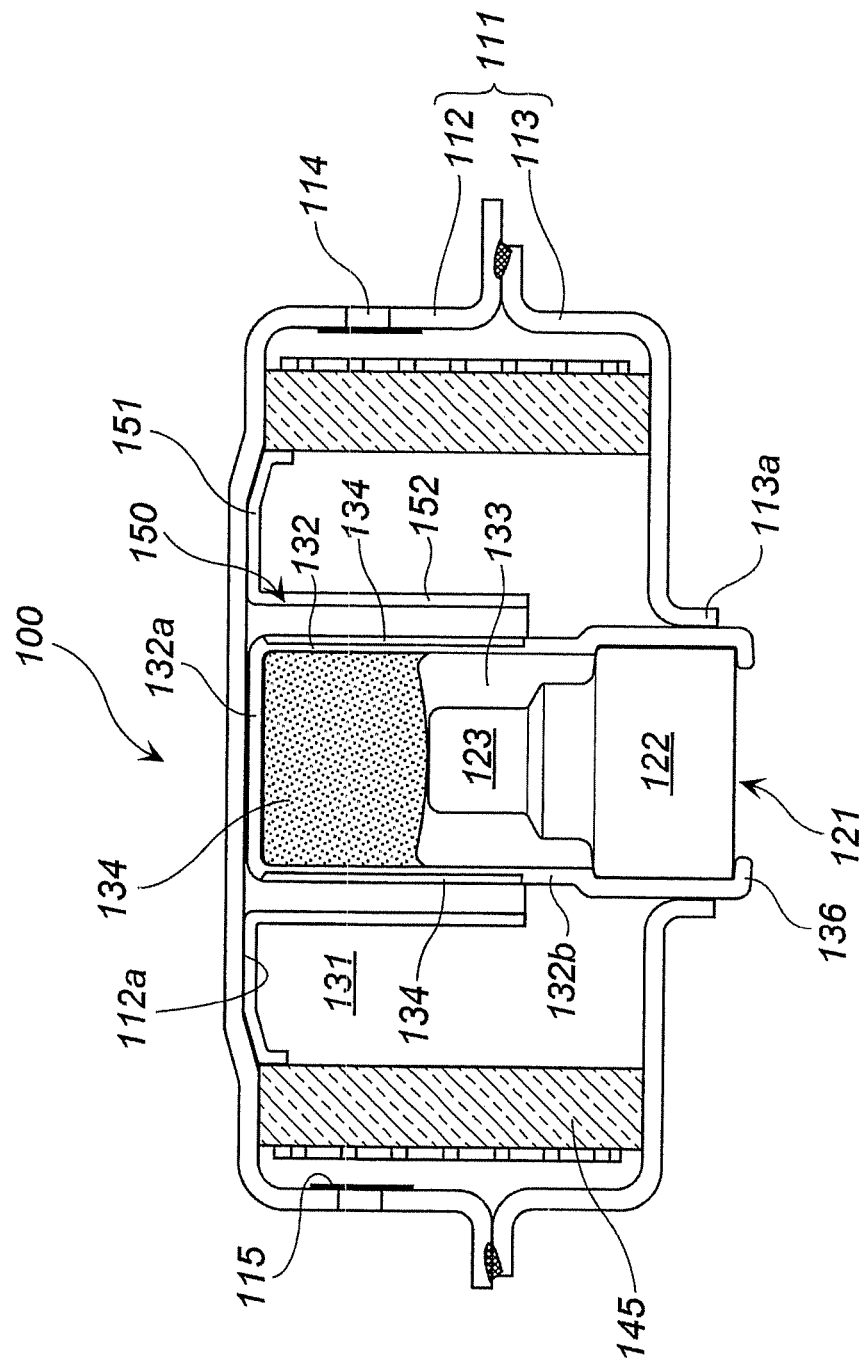
FIG. 7 shows an axial sectional view of the inflator of another embodiment.

(2) Inflator Shown in FIG. 7

Figure 8:
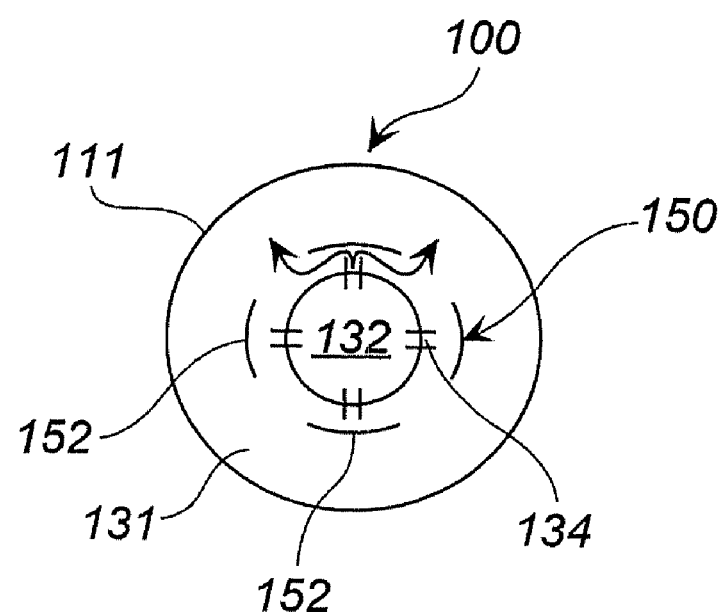
FIG. 8 shows an explanatory drawing illustrating the operation of the inflator shown in FIG. 7.

FIG. 7 is a longitudinal sectional view of an inflator having a single combustion chamber. FIG. 8 is a plan view illustrating a schematic partial structure for explaining the operation of the inflator shown in FIG. 7.

An outer shell of a gas generator 100 for an airbag is formed by a housing 111 obtained by joining together and integrating a diffuser shell 112 and a closure shell 113. The diffuser shell 112 and the closure shell 113 are welded to each other in joint portions thereof.

A plurality of gas discharge ports 114 are provided in the circumferential surface of the diffuser shell 112, and the gas discharge ports 114 are closed from the inside with an aluminum or stainless steel seal tape 115.

A single hole is provided in the bottom surface of the closure shell 113, and an ignition device 121 is inserted into the hole so that the penetration of moisture from the external atmosphere can be prevented.

The ignition device 121 has an igniter 123 fixed to a igniter collar 122. A connector having lead wire are fitted into portions including two electroconductive pins that extend from the igniter 123, and the connector is connected to a battery.

A combustion chamber 131 is provided inside the housing 111. A first gas generating agent not shown in the drawing is charged inside the combustion chamber 131.

An enhancer chamber cup member 132 is disposed inside the combustion chamber 131, and the inside of the enhancer chamber cup member 132 is an enhancer chamber 133 and has accommodated therein an enhancer agent 134 that is charged into a stainless steel container.

The opening portion of the enhancer chamber cup member 132 is fitted to the igniter collar 122, the peripheral edge 132a of the opening portion protrudes out of a hole provided in the bottom surface of the closure shell 113, and the igniter collar 122 is fixed by crimping a peripheral edge 136 of the opening portion. The peripheral edge 136 of the opening portion is fixed by being sandwiched by a flange portion 113a forming a hole of the closure shell 113. The bottom portion 132a of the enhancer chamber cup member 132 abuts against a ceiling surface 112a of the housing 111.

An annular retainer for adjusting the volume of the combustion chamber 131 according to a charged amount of the gas generating agent can be disposed inside the combustion chamber 131. The retainer can be attached by fitting to the enhancer chamber cup member 132.

A cylindrical coolant/filter 145 having a function of filtering and cooling the combustion gas is disposed outside the combustion chamber 131, and a gap is provided between the outer circumferential surface of the coolant/filter 145 and the gas discharge port 114 as well as the seal tape 115.

A slit-like gas ejection opening 134 identical to that shown in FIG. 3(a) is provided in the height direction (axial direction of the housing 111) in the circumferential surface 132b of the enhancer chamber cup member 132. A total of four slit-like gas ejection openings 134 are provided equidistantly in the circumferential direction.

A collision member 150 is attached in the combustion chamber 131. The collision member 150 has a flange portion 151 and a collision surface portion 152 and is attached in a state in which the flange portion 151 is fitted onto the inner peripheral surface of the coolant/filter 145. The collision surface portion 152, as shown in FIG. 8, is present only in the positions directly opposite the four slit-like gas ejection openings 134 provided in the circumferential surface 132b of the enhancer chamber cup member 132, and an opening portion is provided in a portion which does not have the collision surface portion 152.

As obvious as shown in FIG. 7, because the enhancer chamber cup member 132 and the collision member 150 are disposed close to each other, an amount of the gas generating agent charged in the gap between the enhancer chamber cup member 132 and the collision member 150 is small or, preferably, no gas generating agent is present in the gap. More specifically, similarly to the inflator shown in FIG. 1 and FIG. 2, the gap (L') between the enhancer chamber cup member 132 and the collision member 150 and the diameter R of the gas generating agent (in a single-perforated columnar body shown in FIG. 6) preferably satisfy a relationship of $0.5R<L<3R$, more preferably $0.5R<L<2R$, even more preferably $0.5R<L<R$.

The operation of the gas generator for an air bag shown in FIG. 7 and FIG. 8 in the case where the gas generator is applied to an airbag system of an automobile will be explained below.

When the automobile collides and receives the impact, an actuation signal is received from a control unit, the igniter 123 is actuated and ignited to igniter and burn the enhancer agent 134. Then, the stainless steel tape that seals the slit-like gas ejection opening 134 is ruptured by the increase in pressure inside the enhancer chamber 133, and the combustion products are discharged from the slit-like gas ejection opening 134 (shown by the solid line arrow in FIG. 8).

The discharged combustion products collide with the collision surface portion 152 of the collision member 150 that is disposed directly opposite to the slit-like gas ejection opening 134 to be diffused, then cause ignition and combustion of the gas generating agent charged into the combustion chamber 131, so that a high-temperatuire combustion gas is produced. The combustion gas is filtered and cooled by the coolant/filter 145 while passing through the coolant/filter 145, then ruptures the seal tape 115 and is released from the gas discharge port 114, thereby inflating the airbag.

EXAMPLES

Example 1 and Comparative Example 1

A combustion test was conducted by using a dual-type pyrotechnic inflator shown in FIG. 1. A cup member shown in FIG. 3(a) was used as the enhancer chamber cup member 32 in Embodiment 1, and a cup member shown in FIG. 4 was used as the enhancer chamber cup member 32 in Comparative Example 1.

A molded body of a gas generating composition had the total weight of 40 g and a single-perforated cylindrical shape that was obtained by molding a composition including 41.3 mass % of guanidine nitrate, 48.7 mass % of basic copper nitrate, 5 mass % of aluminum hydroxide, and 5 mass % of carboxymethyl cellulose sodium salt according to a well-known molding method (for example, a method described in Paragraph 42 of JPAA No. 2004-155645).

(1) Discharged Gas Measurement Method 40 g of the gas generating agent was charged into a dual-type pyrotechnic inflator shown in FIG. 1 and combusted inside a 2800-liter tank. The gas generated by the combustion was analyzed in a detector tube.

(2) Mist Measurement Method 40 g of the gas generating agent was charged into a dual-type pyrotechnic inflator shown in FIG. 1 and combusted inside a 60-liter tank. Then, the mist that adhered and remained inside the tank was washed with water, the recovered solution was dried at 110° C., and the mass of the residue was measured.

TABLE 1

|  |  | Embodiment 1 | Comparative Example 1 |
|---|---|---|---|
| Composition of discharged gas | $NO_2$ | 76.5% | 100% |
|  | NO | 81.3% | 100% |
|  | CO | 84.2% | 100% |
|  | $NH_3$ | 82.3% | 100% |
| Internal pressure of combustion |  | 99.8% | 100% |
| Amount of mist (mg) |  | 1085 | 1599 |

Figure 3:
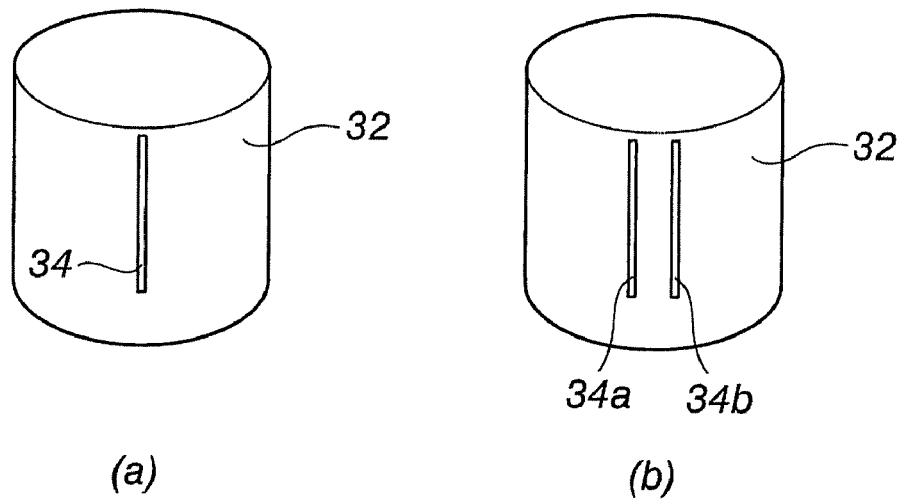
FIG. 3(a) shows a perspective view illustrating the first gas ejection opening in the combustion chamber cup member shown in FIG. 1.
FIG. 3(b) shows a perspective view illustrating the first gas ejection opening in the combustion chamber cup member of another embodiment.

By using the inflator in which the first gas ejection opening 34 of the enhancer chamber cup member directly faced the combustion chamber cup member 41 forming the second combustion chamber 35 (as shown in FIG. 3), the concentration of nitrogen oxides and the like in the generated gas could be greatly reduced. The amount of mist could be also reduced.

From the result obtained therefrom, it can be acknowledged that, when the enhancer chamber cup member shown in FIG. 3(*a*) was used, the combustion products discharged from the first gas ejection opening 34 collided with the combustion chamber cup member 41 and then came into contact with the first gas generating agent. Therefore, normal combustion was ensured without cracking the first gas generating agent.

On the other hand, it is acknowledged that, when the enhancer chamber cup member shown in FIG. 4 was used, the combustion products discharged from the first gas ejection opening 34 directly collided with the gas generating agent, without colliding with the combustion chamber cup member 41. As a result, the gas generating agent was cracked and powdered during the collision, which prevented normal combustion and enhances rapid combustion.

The invention thus described, it will be obvious that the same may be varied in many ways. Such variations are not to be regarded as a departure from the spirit and scope of the invention, and all such modification s as would be obvious to one skilled in the art are intended to be included within the scope of the following claims.

The invention claimed is:

1. An inflator, comprising:
a housing having a gas discharge port;
a first combustion chamber and a second combustion chamber, being defined inside the housing;
a first ignition device and a first gas generating agent accommodated inside the first combustion chamber, a combustion products generated by an activation of the first ignition device being ejected only in one direction; and
a combustion cup member disposed inside the housing and separating the second combustion chamber from the first combustion chamber, the combustion chamber cup member accommodating a second gas generating agent and a second ignition device, the combustion chamber cup member being disposed in a position directly facing the ejecting direction of the combustion products, and a circumferential surface of the combustion chamber cup member serving as a collision member for receiving collision of the combustion products.

2. The inflator according to claim 1, wherein at least an ignition portion of the ignition device is surrounded by an ignition device cup member defining the first combustion chamber therein, and the ignition device cup member has a gas ejection opening that is open only in said one direction to discharge the combustion products.

3. The inflator according to claim 1, wherein the second combustion cup member has a curved surface that directly opposes the discharge direction of the combustion products.

4. The inflator according to claim 2, wherein the second combustion cup member has a curved surface that directly opposes the gas ejection opening.

5. The inflator according to claim 2, further comprising:
a third combustion chamber defined inside the housing and outside the combustion cup member and the ignition device cup member.

6. The inflator according to claim 2, wherein the gas ejection opening is a slit formed in a circumferential surface of the ignition device cup member.

7. The inflator according to claim 4, wherein the gas ejection opening includes a plurality of slits formed in a circumferential surface of the ignition device cup member.

* * * * *